United States Patent
Kaup et al.

(10) Patent No.: US 6,687,318 B1
(45) Date of Patent: Feb. 3, 2004

(54) METHOD AND COMMUNICATION SYSTEM FOR SYNCHRONIZING TWO DEVICES WITH A PREDETERMINABLE DATA TRANSMISSION METHOD

(75) Inventors: Andre Kaup, Höhenkirchen (DE); Jürgen Pandel, Feldkirchen-Westerham (DE); Bernhard Wimmer, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/486,578

(22) PCT Filed: Aug. 12, 1998

(86) PCT No.: PCT/DE98/02328

§ 371 (c)(1),
(2), (4) Date: Feb. 29, 2000

(87) PCT Pub. No.: WO99/12299

PCT Pub. Date: Mar. 11, 1999

(30) Foreign Application Priority Data

Aug. 29, 1997 (DE) ......................................... 197 37 850

(51) Int. Cl.⁷ ................................................. H04L 7/06
(52) U.S. Cl. ....................... 375/364; 375/366; 370/324; 370/509; 714/707; 714/751; 714/758; 714/789
(58) Field of Search ................................. 375/231, 220, 375/354, 364, 365, 366; 370/503, 505, 509, 510–514, 324, 252, 278, 350, 461, 462, 466, 467; 714/707, 751, 758, 755, 789

(56) References Cited

U.S. PATENT DOCUMENTS 4,701,923 A 10/1987 Fukasawa et al.
4,876,740 A * 10/1989 Levine et al. ............... 455/422
5,142,528 A * 8/1992 Kobayashi et al. ......... 370/469

(List continued on next page.)

FOREIGN PATENT DOCUMENTS

| EP | 0 540 351 | 5/1993 |
| EP | 0 642 228 | 3/1995 |
| EP | 0 760 562 | 3/1997 |
| EP | 0 798 890 | 10/1997 |
| WO | 96/32717 | 10/1996 |
| WO | 97/49193 | 12/1997 |

OTHER PUBLICATIONS

D. Lindbergh, "The H.324 Multimedia Communication Standard", IEEE Communications Magazine, vol. 34, No. 12, Dec. 1996, pp. 46–51.
A. S coon, "To Err is Computer", EXE Magazine, vol. 5, No. 6, Nov. 1990, pp. 54, 56, 59–60.
ITU–T Recommendation H.223, Multiplexing Protocol for Low Bitrate Multimedia Communication, 1996.

(List continued on next page.)

*Primary Examiner*—Stephen Chin
*Assistant Examiner*—Dac V. Ha
(74) *Attorney, Agent, or Firm*—Staas & Halsey LLP

(57) ABSTRACT

A method and a communication system are in which a first synchronization message identifying a data transmission method with the highest-level error protection that a first device is capable of executing is transmitted from said first device to a second device. In the second device, the data transmission method is detected from the first synchronization message. In case the detected data transmission method is supported by the second device, a second synchronization message is sent to the first device identifying the detected data transmission method.

In the first device, the data transmission method is detected from the second synchronization message, and in case the detected data transmission method can be executed by the first device, the devices are synchronized with the data transmission method.

11 Claims, 3 Drawing Sheets

U.S. PATENT DOCUMENTS

| | | | | |
|---|---|---|---|---|
| 5,440,405 A | | 8/1995 | Ahmed | |
| 5,517,324 A | * | 5/1996 | Fite et al. | 358/434 |
| 5,537,398 A | * | 7/1996 | Siwiak | 370/204 |
| 5,544,335 A | * | 8/1996 | Motomura | 709/228 |
| 5,729,557 A | * | 3/1998 | Gardner et al. | 714/774 |
| 5,768,309 A | * | 6/1998 | Olafsson | 375/221 |
| 5,982,819 A | * | 11/1999 | Womack et al. | 375/316 |
| 6,192,070 B1 | * | 2/2001 | Poon et al. | 375/222 |

OTHER PUBLICATIONS

ITU–T Recommendation H. 223/Annex A. Multiplexing Protocol for Low Bitrate Multimedia Communication Level 1, Draft Version, Jul. 1997.

ITU–T Recommendation H.223/Annex B, Multiplexing Protocol for Low Bitrate Multimedia Communication Level 2, Draft Version, Jul. 1997.

ITU–T Recommendation H.223/Annex C. Multiplexing Protocol for Low Bitrate Multimedia Communication Level 3, Draft Version, Jul. 1997.

* cited by examiner

METHOD AND COMMUNICATION SYSTEM FOR SYNCHRONIZING TWO DEVICES WITH A PREDETERMINABLE DATA TRANSMISSION METHOD

This application is a 371 of PCT/DE98/02328 which filed on Aug. 12, 1998, and which is a continuation of Germany 19737850.1 filed on Aug. 29, 1997.

BACKGROUND OF THE INVENTION

The present invention relates to the synchronization of two devices with a data transmission method.

In the transmission of compressed data, for instance audio-visual data, textual data, video data or control information, errors in the transmission can disrupt a subsequent decompression such that the data can no longer be reconstructed correctly.

In the context of the transmission of highly compressed data currents, the following communication system architecture is known, which is illustrated in FIG. 2 (cf. [1]):

Applications of a predeterminable number of application layers Ai (i=1 . . . n) generate data Di, which are to be transmitted from a first device V1 to a second device V2.

The data Di that are to be transmitted are respectively delivered to what is known as an adaptation layer Ali, which is allocated to the respective application Ai.

The different types of adaptation layers described in [1] serve for processing different characteristic data.

Data should be understood here as, for instance, audio data, video data, textual data (in particular, data that are coded according to ASCII code)—generally any kind of data that can be transmitted in digital form.

From the respective adaptation layer Ali, adapted data Adi are fed to a multiplexer MUX/DEMUX for purposes of forming a combined, i.e. multiplexed, data current XD.

Via a transmission unit UE, for instance a wirebound network or a mobile radio network, the data current XD is transmitted to the second device V2. The second device V2 has the same structure as the first device V1. In the second device V2 the multiplexed data current XD is split into the individual adaptive data adi again; that is, demultiplexed. The adapted data Adi is fed by the multiplexer/demultiplexer MUX/DEMUX to the elements of the adaptation layer Ali of the second device V2. The double arrows in the individual communication paths indicate that the communication between the first device V1 and the second device V2 can occur bidirectionally.

In the method taught in ITU-T Recommendation H.223, *Multiplexing Protocol for Low-Bitrate Multimedia Communication* 1996, a separate error detection method and/or error correction method is carried out for the data in the adaptation layer.

The more higher-level or robust the error detection method, or the error correction method, (i.e. the more errors can be detected, or corrected in the transmission), the greater the demand for bandwidth in the transmission of the data currents grows, due to additional redundancy information that is required for error correction, or error detection. Furthermore, the complexity of the error detection, or error correction method, grows with rising executions which leads to an elevated demand for computing time both for the encoding at the sender and for the decoding at the receiver.

For this reason, documents ITU-T Recommendation H.223, *Multiplexing Protocol for Low-Bitrate Multimedia Communication* 1996 (cf. Reference 1); ITU-T Draft Recommendation H.223/Annex A, Multiplexing Protocol for Low-Bitrate Mobile Multimedia Communication, Level 1, Draft version, July, 1997 (cf. Reference 2); ITU-T Draft Recommendation H.223/Annex B, *Multiplexing Protocol for Low-Bitrate Mobile Multimedia Communication*, Level 2, Draft version, July, 1997 (cf. Reference 3); and ITU-T Draft Recommendation H.223/Annex C, *Multiplexing Protocol for Low-Bitrate Mobile Multimedia Communication*, Level 3, Draft version, July, 1997 (cf. Reference 4) teach the provision of various error detection methods, or respectively, error correction methods, that are more or less robust, depending on requirements, but are less or more complex, accordingly.

Reference 1, Reference 2, Reference 3, Reference 3 and Reference 4 define various methods of different levels henceforth referred to as data transmission methods (level 0 . . . 3). A first data transmission method (level 0) (corresponding to Reference 1), which every device must have implemented; a second data transmission method (level 1)(corresponding to Reference 2); a third data transmission method (level 2); and a fourth data transmission method (level 3). The error robustness, that is, the level of the method with respect to error protection (error detection, or error correction), rises from the first transmission method (level 0) to the fourth transmission method.

Every device that functions according to the method taught in ITU-T Recommendation H.223, *Multiplexing Protocol for Low-Bitrate Multimedia Communication* 1996 therefor; must be able to guarantee at least the first data transmission method (level 0). The additional data transmission (level 0 . . . 3)methods are optional, which means that different devices can communicate with one another that do not have the same maximal capability of error protection implemented. Problems can arise in this case, since at the beginning of the communication connection it must first be worked out according to which data transmission method the data transmission is to occur (synchronization with a data transmission method).

SUMMARY OF THE INVENTION

It is an object of the present invention to provide a method and a communication system for synchronizing two devices with a predeterminable data transmission method from a set of data transmission methods, whereby the synchronization can be accomplished simply and automatically.

This object is achieved in accordance with the present invention in a method for synchronizing two devices with a predeterminable data transmission method from a set of data transmission methods that differ with respect to their error protection for transmitted data, said method comprising the steps of: a first device and a second device respectively exchanging a first synchronization message and a second synchronization message, said first synchronization message having an item of information identifying a data transmission method having a highest-level error protection that can be executed by said first device, said second synchronization message having an item of information identifying a data transmission method having a highest-level error protection that can be executed by said second device; determining said data transmission method of said received first synchronization message at said second device from said received first synchronization message; determining said data transmission method of said received second synchronization message at said first device from said received second synchronization message; forming an additional synchronization message at one of said first and second devices by which said respectively determined data transmission method can be executed, said additional synchronization message identifying said data transmission method that can be executed by both said first device and said second device; sending said additional synchronization message to an other of said first and second devices; determining said data transmission method of said additional synchronization message at said other of said first and second devices from said additional synchronization method; and synchronizing said first device and said second device with said determined data transmission method. This object is also achieved in accordance with the present invention in a communication system for synchronizing two devices with a predeterminable data transmission method from a set of data transmission methods that differ with respect to their error protection for data to be transmitted, said communication system comprising:

a first device; and a second device connected to said first device, said first device and said second device respectively for exchanging a first synchronization message and a second synchronization message, said first synchronization message having an item of information identifying a data transmission method having a highest-level error protection that can be executed by said first device, said second synchronization message having an item of information identifying a data transmission method having a highest-level error protection that can be executed by said second device, said second device for determining said data transmission method of said received first synchronization message from said received first synchronization message, said first device for determining said data transmission method of said received second synchronization message from said received second synchronization message, said first and second device for forming an additional synchronization message at one of said first and second devices by which said respectively determined data transmission method can be executed, said additional synchronization message identifying said data transmission method that can be executed by both said first device and said second device;

said first and second devices for sending said additional synchronization message to an other of said first and second devices;

said first and second devices for determining said data transmission method of said additional synchronization message at said other of said first and second devices from said additional synchronization method, and said first and second devices for synchronizing said first device and said second device with said determined data transmission method.

A first device and a second device exchange synchronization messages, whereby a respective synchronization message contains an item of information identifying the data transmission method with the highest-level error protection that the respective device that has sent the synchronization message is capable of executing. The data transmission method of the respective synchronization message is ascertained by the respective receiving device from the received synchronization message. A further synchronization message is formed by the device by which the respectively determined data transmission method can be executed and is delivered to the respective other device, whereby the additional synchronization message identifies the data transmission method which both devices are capable of executing. The data transmission method of the additional synchronization message is determined from the additional synchronization message. Now the devices are synchronized with the determined data transmission method.

In an embodiment the communication system comprises a first device and a second device, which are so arranged that a first device and a second device exchange synchronization messages, whereby a respective synchronization message contains an item of information identifying a data transmission method with the highest level of error protection that the respective device that has sent the synchronization message is capable of executing;

from the received synchronization message, the data transmission method of the respective synchronization message is respectively determined by the respective receiving device;

a further synchronization message is formed by the device by which the respectively determined data transmission method can be executed and is delivered to the respective other device, whereby the additional synchronization message identifies the data transmission method that both devices are capable of executing;

from the additional synchronization message, the data transmission method of the additional synchronization message is determined;

the devices are synchronized with the determined data transmission method.

A synchronization possibility is thus put forward with which the synchronization of two devices with respect to the data transmission method used is accomplished, and a common basis for further communication thereby established, without added complexity.

A further advantage of the invention is that it can be expanded without further ado into future data transmission methods which are not yet defined in their respective realization. The invention thus automatically always guarantees a downward-compatibility with the "older devices" even given future development of the data transmission method.

The invention can clearly be seen as the exchanging by the devices of synchronization messages indicating which data transmission method is maximally supported by the respective device. Based on the type of synchronization message, the receiving device detects the data transmission method indicated and, when its own suggested data transmission method is higher-level than the one suggested by the other device, the data transmission method of the less capable device is automatically selected, and a synchronization message containing the selected data transmission method is formed and delivered as acknowledgment.

To improve the reliability of the detection of the data transmission method from the synchronization message in the receiving device, it is advantageous for a device to send a synchronization message multiple times, the receiving device intepreting the data transmission method as detected when this has been identically determined multiple times.

These and other features of the invention(s) will become clearer with reference to the following detailed description of the presently preferred embodiments and accompanied drawings.

DETAILED DESCRIPTION OF THE PRESENTLY PREFERRED EMBODIMENTS

Figure 1:
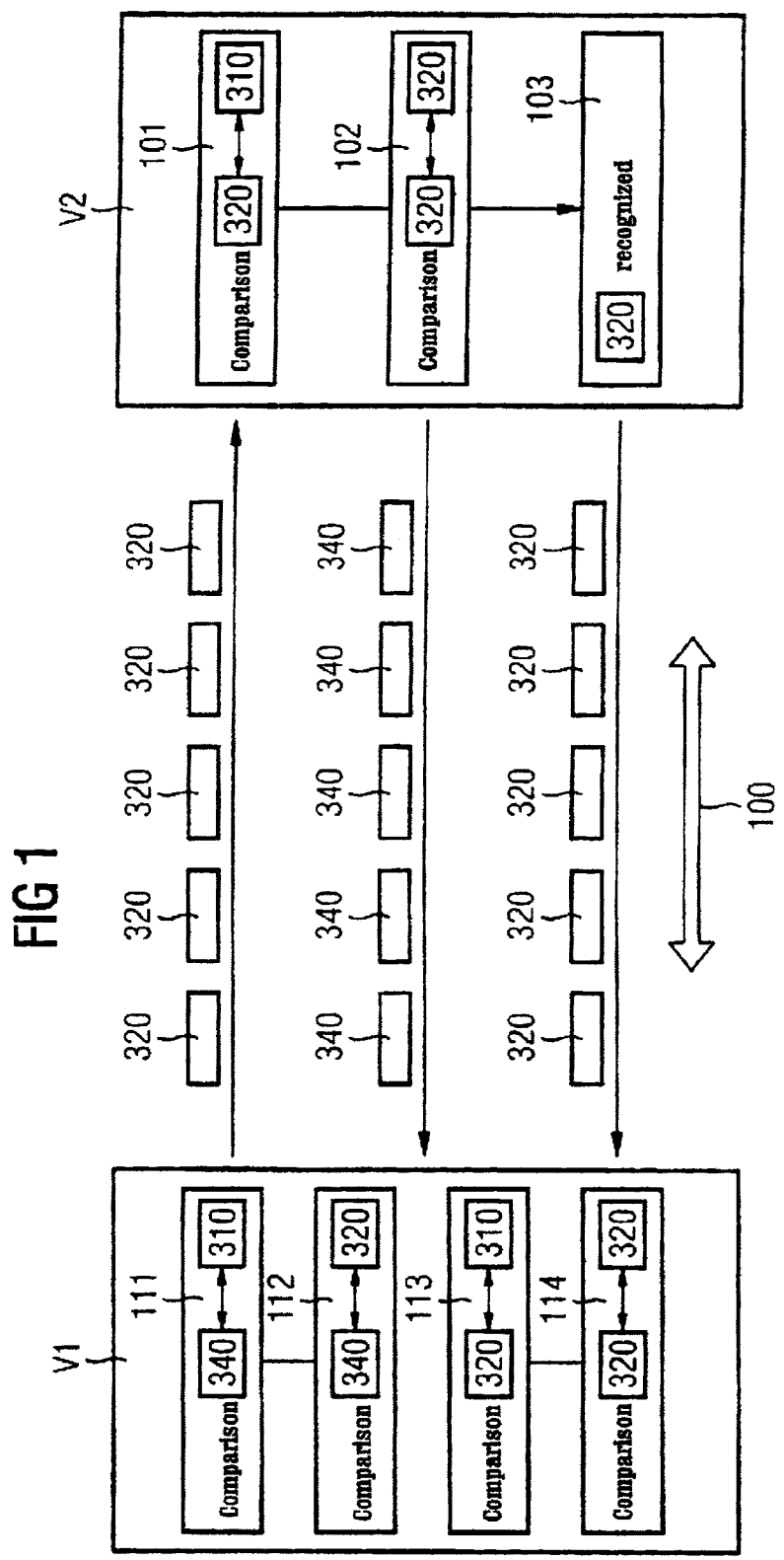
FIG. 1 is a block diagram of a communication flowchart describing the exchange of messages between the first and second devices.
Figure 2:
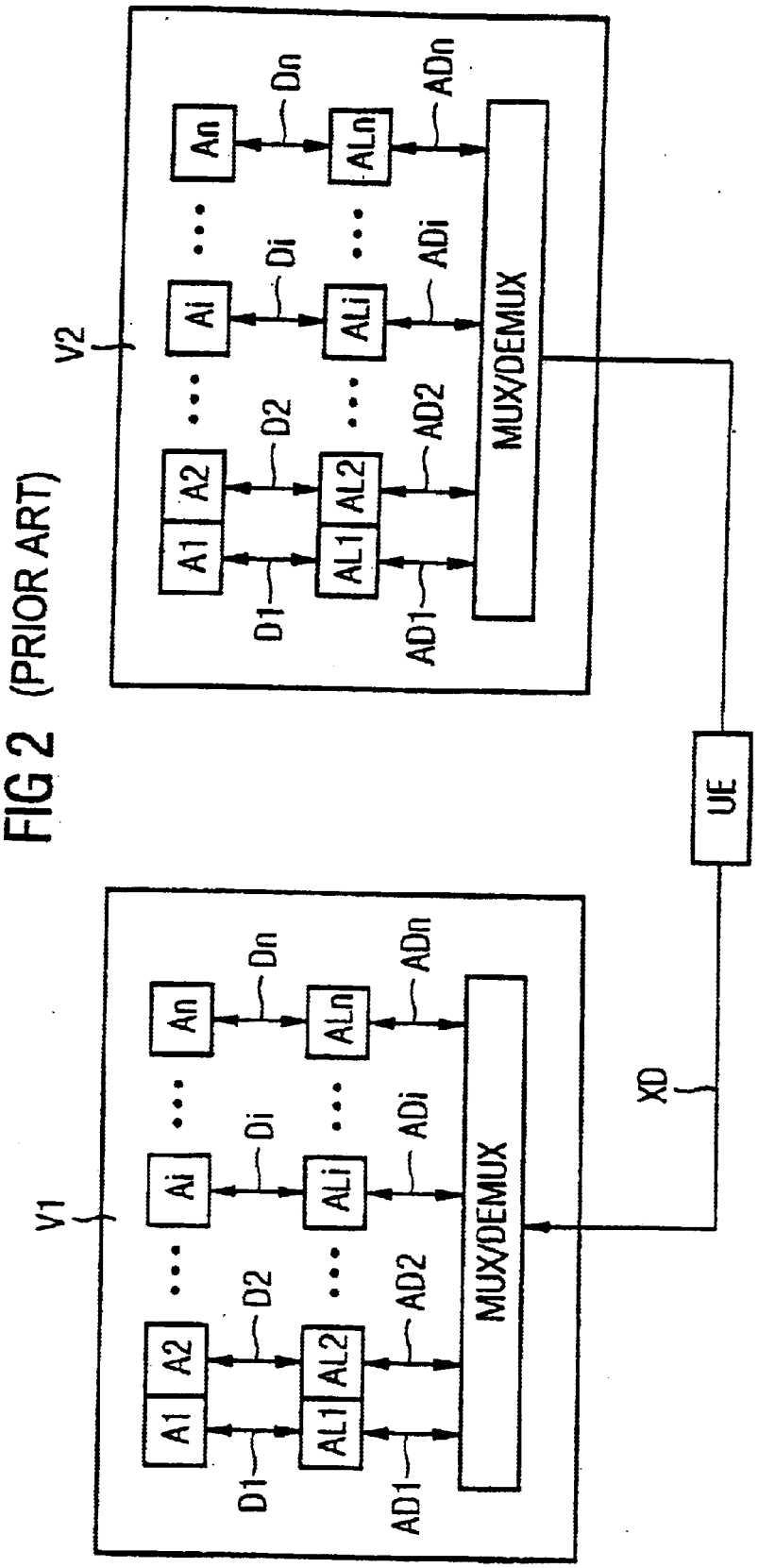
FIG. 2 is a block diagram describing the architecture of the devices according to the method taught in ITU-T Recommendation H.223, *Multiplexing Protocol for Low-Bitrate Multimedia Communication* 1996.

FIGS. 3a to 3d illustrate the data formats of the various data transmission methods described in Reference 1, Reference 2, Reference 3 and Reference 4.

The first transmission method (level 0), which is designed according to the H.223 standard, comprises the following structure of data packets 301 (cf. FIG. 3a), into which the multiplexed data XD has been divided:

- an unambiguous synchronization word 8 bits long in the data packet 301 that clearly marks the beginning of a data packet 301;
- an item of control information 303;
- a message data field 304 in which the data to be transmitted is transmitted between the devices V1, V2.

The data packet 301 is limited at its end again by an unambiguous synchronization word.

The basic structure of the data packet is the same in all data transmission methods H.223, H.223/annex A, H.223/Annex B and H.223/Annex C.

But the formats of the data packets differ in the length of the first two fields of the data packet; that is, in the length of the synchronization word 302 and the header 303 (i.e. the control information).

Thus, the synchronization word 302 comprises 24 bits in the method according to H.223 and H.223/Annex A, and 32 bits in the method according to H.223/Annex B, for example. The method according to H.223/Annex C likewise comprises a synchronization word 302 that is 32 bits long.

For each data transmission method, a specific schema is provided which makes it possible to transmit information in case there are no message data requiring transmission by the individual applications Ai.

This schema is used below and is referenced the stuffing sequence. In the context of the first data transmission method, a series of 3 synchronization words of a length of 8 bits are transmitted as stuffing sequence 310 (cf. FIG. 3b).

Figure 3A:
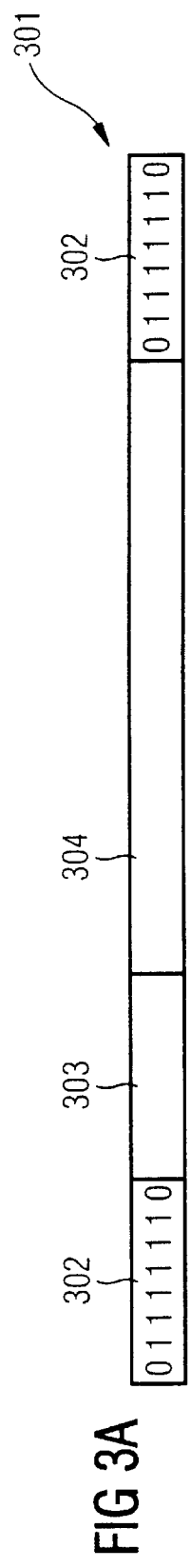
FIGS. 3a to 3d show block diagrams illustrating the data formats of the messages according to the various data transmission methods.
Figure 3B:
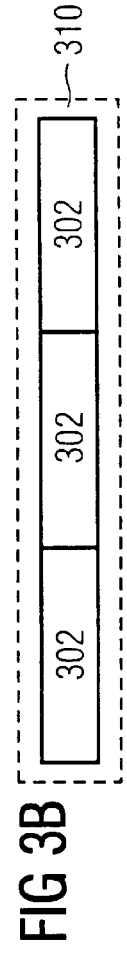
Figure 3C:
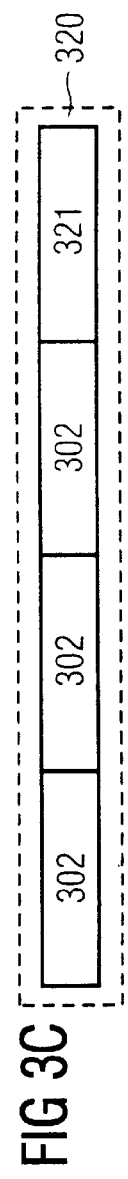
Figure 3D:
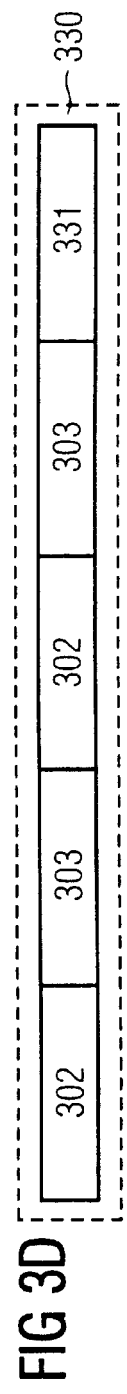

FIG. 3c illustrates the stuffing sequence 320 that is employed according to the method H.223/Annex A. Three 8-bit synchronization words 302 and a 16-bit pseudonoise sequence 321 are used as stuffing sequence 320.

In the method according to H.223/Annex B (cf. FIG. 3d) a series of synchronization words 302 of a length of 8 bits, header information 303, 8-bit synchronization word 302 and header information 303 and a pseudonoise sequence 331 that is 32 bits long is utilized as stuffing sequence 330. For purposes of the unambiguous marking of the stuffing sequence 330, it is provided according to the method according to H.223/Annex B that a series of 4 bits having the value 0 is given in the header field as multiplex code.

The marking for a stuffing sequence (not illustrated) of the method according to H.223/Annex C can be accomplished unambiguously in that, in the header field 302 of the stuffing sequence of the method according to H.223/Annex B, with the same structure of the stuffing sequence the 4 bits of the header field 303 with which the multiplex code is indicated are all assigned the value 1.

The respective data transmission method to which the structure of the stuffing sequence 310,320,330 respectively relates is thus unambiguously marked by sending the stuffing sequence.

The following initial situation is assumed below for the sake of a simpler illustration:

The first device V1 supports the first data transmission method (H.223) and the second data transmission method (H.223/Annex A). The second device V2 supports all data transmission methods; that is, the first data transmission method (H.223), the second data transmission method (H.223/Annex A), the third transmission method (H.223/Annex B), and the fourth data transmission method (H.223/Annex C).

For purposes of synchronization, that is, for selecting the data transmission method to be used for the transmission of message data, each device V1,V2 respectively sends a synchronization message; that is, the respective stuffing sequence that marks the highest-level data transmission method with respect to error protection (error detection and/or error correction) which the respective device V1,V2 supports.

The first device V1 thus sends a first synchronization message in the form of the stuffing sequence 320 that marks the second data transmission method. To increase the reliability of the synchronization, the stuffing sequence 320 is sent repeatedly.

The second device V2 sends the stuffing sequence 320 that marks the fourth data transmission method.

The second device V2 receives the first synchronization message multiple times and attempts to determine, based on the stuffing sequence 320, the data transmission method that is maximally supported by the first device.

This occurs in that, based on the first data transmission method (H.223), the first synchronization message is compared to the data format of the stuffing sequence 310 marking the first data transmission method (step 101).

The comparison is accomplished using a known correlator as described in [4], which functions as follows:

With the aid of a correlator of length L, it is checked whether a predetermined bit pattern of length L is contained in a data current. This occurs by means of a bit-by-bit comparison (XOR logic operation) of the predetermined bit pattern with L consecutive bits of the data current that is being compared. If all L bits match—that is, if the sum of the ones contained subsequent to the XOR logic operation equals L—then the sought bit pattern is contained in the data current. If not, the L-bit search pattern is shifted in the data current, and the logic operation is repeated. Given faulty transmission, the bit pattern in the data current is also considered detected when the number of ones subsequent to the XOR logic operation is only insignificantly lower than L.

If the stuffing sequence of the first synchronization message does not match the stuffing sequence 310 of the first data transmission method, then the received first synchronization message is compared to the stuffing sequence 320 of the second data transmission method. The comparisons are continued successively until the stuffing sequence from the first synchronization message matches a stuffing sequence of a data transmission method of the second device V2 (steps 102,103).

When the second device V2 detects the stuffing information of a data transmission method that is supported by the second device V2 from the first synchronization message, a second synchronization message is formed by the second device V2 likewise containing the detected stuffing sequence, and the second synchronization message is sent to the first device V1, also repeatedly.

The second synchronization message clearly serves as an acknowledgment that the second device V2 has accepted the data transmission method that was "suggested" by the first device V1.

The third synchronization message, which was sent by the second device V2, with the stuffing information 340 of the fourth data transmission method is received by the first device V1.

It is attempted to detect the stuffing sequence in the first device V1 also, in the same manner as described above. The stuffing sequence 340 of the third synchronization message is thus compared to the stuffing sequence 310 of the first data transmission method (step 111).

Since these stuffing sequences 310, 340 do not match, in a further step 112 the stuffing information 340 of the third synchronization message is compared to the stuffing information 320 of the second data transmission method.

Since this comparison also ends in a negative result, but the second data transmission method is the highest-level data transmission method that is supported by the first device V1, the comparison in the first device V1 is interrupted.

However, subsequent to the receipt of the second synchronization message having the stuffing sequence 320 of the second data transmission method, a new comparison is started between the stuffing sequence of the second synchronization message to the stuffing sequence of the first data transmission method (step 113). [sic]

Since these items of stuffing information do not match, in another comparison the stuffing sequence 320 of the second synchronization message is compared to the stuffing sequence 320 of the second data transmission method (step 114). As a result of the detected match of the stuffing, sequence of the second synchronization message and the stuffing sequence 320 of the second data transmission method, it has now been determined in the first device V1 which data transmission method is used for the future transmission of the payload data.

Further communication between the first device V1 and the second device V2 is now accomplished according to the synchronized second data transmission method.

In this way, the use of the highest-level data transmission method that is maximally supported by both devices V1 and V2 for communication (that is, for the transmission of the payload data 100) is achieved without outlay in the form of additional control information.

The inventive method thus integrates into existing communication standards conformably.

Due to the use of an inband signaling, it is not necessary to modify existing communication standards such as GSM, PSTN or DECT. In existing communication standards there are already modules that are able to detect the stuffing sequences. It is thus possible to integrate and implement the method into existing standard methods without further ado, without increasing the complexity of the existing communication standards.

A few alternatives to the above described exemplifying embodiment are described below:

For example, it is provided in an alternative of the exemplifying embodiment that the comparison of the stuffing sequences is not begun at the lowest-level data transmission method every time a new synchronization message is received, but rather, that it is likewise possible to begin the new comparison at the stuffing sequence last examined.

It is also not absolutely necessary to execute the comparisons in succession. They can also be executed in parallel, whereby the speed of the synchronization can be increased.

The invention can clearly be seen as the exchanging of synchronization messages by the devices, which messages respectively indicate which data transmission method is maximally supported by the respective device. Based on the type of synchronization message, the receiving device detects the indicated data transmission method and, when its own suggested data transmission method is higher-level than the one suggested by the other device, the data transmission method of the less capable device is automatically selected, and a synchronization message containing the selected data transmission method is formed and delivered as acknowledgment.

Although modifications and changes may be suggested by those of ordinary skill in the art, it is the intention of the inventors to embody within the patent warranted hereon all changes and modifications as reasonably and properly come within the scope of their contribution to the art.

What is claimed is:

1. A method for synchronizing two devices with a predeterminable data transmission method from a set of data transmission methods that differ with respect to their error protection for transmitted data, said method comprising:

exchanging a first synchronization message and a second synchronization message between respectively a first device and a second device, said first synchronization message having an item of information identifying a data transmission method having a highest-level error protection that can be executed by said first device, said second synchronization message having an item of information identifying a data transmission method having a highest-level error protection that can be executed by said second device;

determining said data transmission method of said received first synchronization message at said second device from said received first synchronization message;

determining said data transmission method of said received second synchronization message at said first device from said received second synchronization message;

forming an additional synchronization message at one of said first and second devices by which said respectively determined data transmission method can be executed, said additional synchronization message identifying said data transmission method that can be executed by both said first device and said second device;

sending said additional synchronization message to an-other of said first and second devices;

determining said data transmission method of said additional synchronization message at said other of said first and second devices from said additional synchronization message; and synchronizing said first device and said second device with said determined data transmission method.

2. The method as claimed in claim 1, further comprising exchanging at least one of said first and second synchronization messages a predeterminable number of times.

3. The method as claimed in claim 2, wherein said first and second devices are synchronized to a data transmission method when said data transmission method has been detected a predeterminable number of times.

4. The method as claimed in claim 1, wherein said set of data transmission methods comprises a data transmission method according to the ITU standard H.223.

5. A communication system for synchronizing two devices with a predeterminable data transmission method from a set of data transmission methods that differ with respect to their error protection for data to be transmitted, said communication system comprising:

a first device; and a second device connected to said first device, said first device and said second device respectively for exchanging a first synchronization message and a second synchronization message, said first synchronization message having an item of information identifying a data transmission method having a highest-level error protection that can be executed by said first device, said second synchronization message having an item of information identifying a data transmission method having a highest-level error protection that can be executed by said second device, said second device for determining said data transmission method of said received first synchronization message from said received first synchronization message, said first device for determining said data transmission method of said received second synchronization message from said received second synchronization message, said first and second devices for forming an additional synchronization message at one of said first and second devices by which said respectively determined data transmission method can be executed, said additional synchronization message identifying said data transmission method that can be executed by both said first device and said second device;

said first and second devices for sending said additional synchronization message to an-other of said first and second devices;

said first and second devices for determining said data transmission method of said additional synchronization message at said other of said first and second devices from said additional synchronization message, and said first and second devices for synchronizing said first device and said second device with said determined data transmission method.

6. The communication system as claimed in claim 5, wherein at least one of said first and second devices is arranged for exchanging at least one of said first and second synchronization messages a predeterminable number of times.

7. The communication system as claimed in claim 6, wherein at least one of said first and second devices is arranged for synchronizing said first and second devices to a data transmission method when said data transmission method has been detected a predeterminable number of times.

8. The communication system as claimed in claim 5, wherein said set of data transmission methods comprises a data transmission method according to the ITU standard H.223.

9. The communication system as claimed in claim 5, wherein at least one of said first and second devices is a mobile communication terminal device.

10. A method for synchronizing devices with a common data transmission method from a set of data transmission methods that differ with respect to error protection for transmitted data, said method comprising:

exchanging between a first device and a second device, a first synchronization message from the first device and a second synchronization message from the second device, the first synchronization message having an item of information identifying a data transmission method having a highest-level error protection that can be executed by the first device, and the second synchronization message having an item of information identifying a data transmission method having a highest-level error protection that can be executed by the second device;

determining the data transmission method of each of the first and second synchronization messages received at the second and first devices, respectively, by comparing each of the first and second synchronization messages to at least one identifier of a corresponding data transmission method, beginning with a lowest-level data transmission method;

forming at one of the first and second devices an additional synchronization message identifying the common data transmission method that can be executed by both the first and second devices;

sending the additional synchronization message from the one of the first and second devices to another of the first and second devices;

determining at the other of the first and second devices the common data transmission method of the additional synchronization message; and synchronizing the first and second devices to use the common data transmission method.

11. A communication system for synchronizing devices with a common data transmission method from a set of data transmission methods that differ with respect to error protection for data to be transmitted, said communication system comprising:

a first device transmitting a first synchronization message having an item of information identifying a data transmission method having a highest-level error protection that can be executed by said first device; and a second device, coupled to said first device, receiving the first synchronization message from said first device and sending to said first device a second synchronization message having an item of information identifying a data transmission method having a highest-level error protection that can be executed by said second device, said first and second devices determining the data transmission method of the second and first synchronization messages, respectively, by comparison with at least one identifier of a corresponding data transmission method, beginning with a lowest-level data transmission method, one of said first and second devices forming an additional synchronization message identifying the common data transmission method that can be executed by both said first and second devices and sending the additional synchronization message to another of said first and second devices which determines the common data transmission method of the additional synchronization message, so that said first and second devices are synchronized to use the common data transmission method.

* * * * *